(12) United States Patent
Kuivamäki

(10) Patent No.: US 6,352,140 B1
(45) Date of Patent: Mar. 5, 2002

(54) DISC BRAKE TO BE OPENED BY TORQUE

(75) Inventor: Ismo Kuivamäki, Vantaa (FI)

(73) Assignee: KCI Konecranes International PLC, Hyvinkää (FI)

(*) Notice: Subject to any disclaimer, the term of this patent is extended or adjusted under 35 U.S.C. 154(b) by 0 days.

(21) Appl. No.: 09/685,024

(22) Filed: Oct. 10, 2000

(30) Foreign Application Priority Data

Oct. 12, 1999 (FI) .............................. 19992194

(51) Int. Cl.⁷ ..................... F16D 55/08; F16D 55/16
(52) U.S. Cl. ................. 188/72.7; 188/71.2; 188/72.3; 188/166; 188/135; 188/150; 188/157
(58) Field of Search .................. 188/71.1, 71.2, 188/71.4, 72.1, 72.3, 72.7, 73.46, 162, 75, 166, 135, 150, 157, 187, 189, 181

(56) References Cited

U.S. PATENT DOCUMENTS

| | | | |
|---|---|---|---|
| 4,049,098 A | * 9/1977 | Kita et al. | 192/8 R |
| 5,944,148 A | * 8/1999 | Bae et al. | 188/134 |
| 6,010,426 A | * 1/2000 | Nakamura | 477/22 |
| 6,209,690 B1 | * 4/2001 | Kuivamaki et al. | 188/187 |

FOREIGN PATENT DOCUMENTS

| | | |
|---|---|---|
| DE | 2331590 A | 1/1975 |
| DE | 3606039 A | 9/1986 |
| DE | C1-19726656 | 12/1998 |
| EP | A1109918 | 5/1984 |
| WO | WO 8203668 A | 10/1982 |

* cited by examiner

*Primary Examiner*—Matthew C. Graham
*Assistant Examiner*—Devon Kramer
(74) *Attorney, Agent, or Firm*—Birch, Stewart, Kolasch & Birch, LLP

(57) ABSTRACT

The invention relates to a disc brake to be opened by torque, the disc brake being arranged between a drive shaft (3) and a driven shaft (11) and comprising a brake wheel (12) arranged on the driven shaft (3) non-rotatably in the peripheral direction; a friction surface (15) arranged to cooperate with the brake wheel (12); a spring device (14) arranged to press the brake wheel (12) axially against the friction surface (15) and means (19 to 21) causing, by the action of the torque and torsion of the drive shaft (3) and a possible counter-torque of the driven shaft (11), the brake wheel (12) and the friction surface (15) to drift axially apart and, accordingly, the braking coupling between them to loosen against the spring force of the spring device (14), whereby the drive shaft (3) and the driven shaft (11) are interconnected in such a way that they may turn a restricted rotational angle with respect to each other and that means for causing said axial displacement and for loosening the braking coupling comprise cam means (19 to 21) arranged between the brake wheel and the drive shaft.

10 Claims, 3 Drawing Sheets

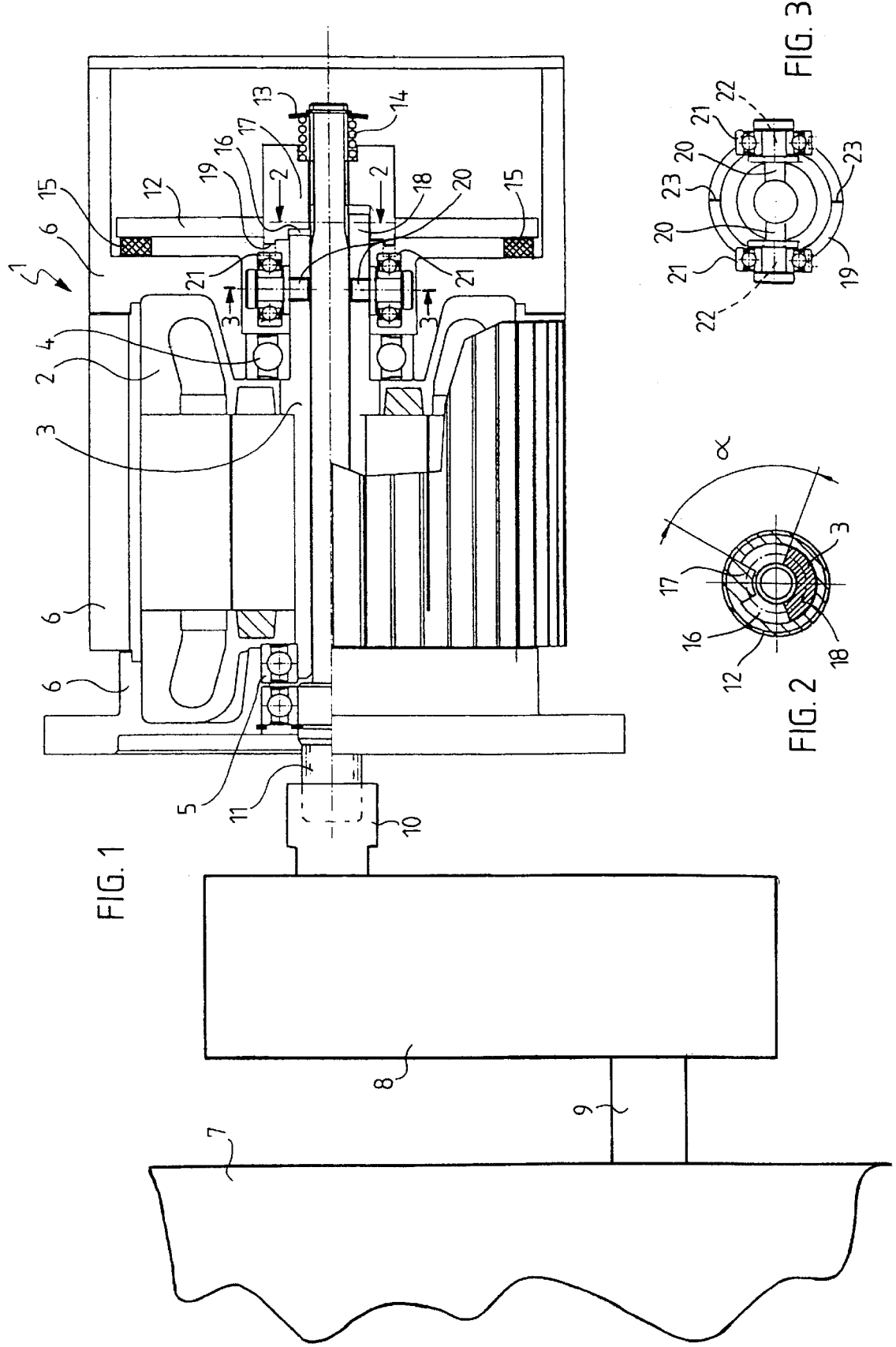

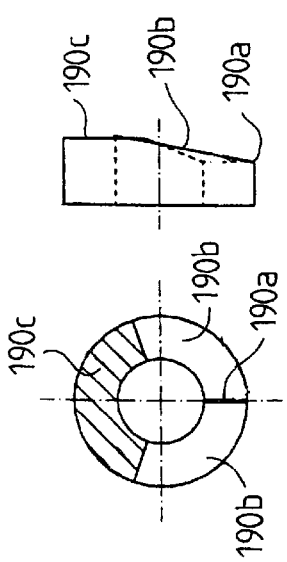
FIG. 5
FIG. 6
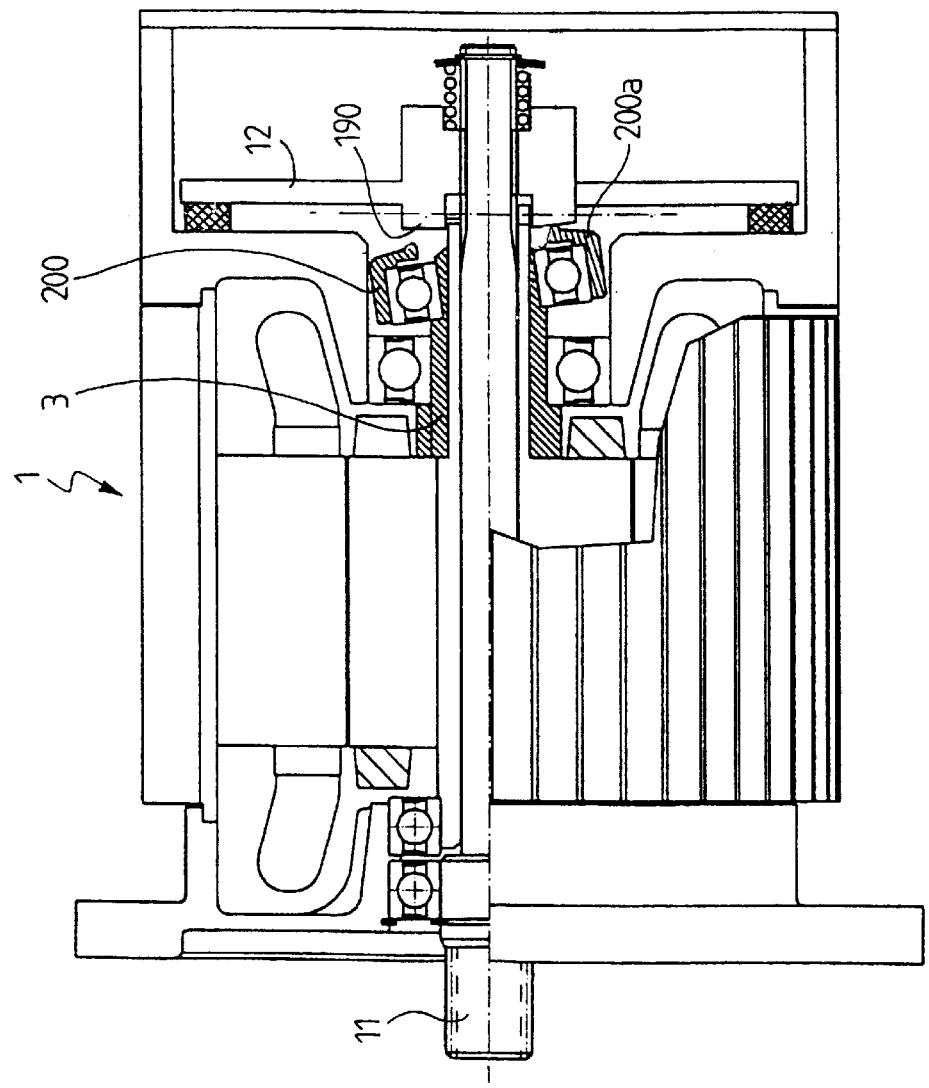
FIG. 4

DISC BRAKE TO BE OPENED BY TORQUE

BACKGROUND OF THE INVENTION

The invention relates to a disc brake to be opened by torque, the disc brake being arranged between a drive shaft and a driven shaft and comprising at least one brake wheel arranged on the driven shaft non-rotatably in the peripheral direction; at least one friction surface arranged to cooperate with the brake wheel; at least one spring device arranged to press the brake wheel axially against the friction surface; and means causing, by the action of the torque and torsion of the drive shaft and a possible countertorque of the driven shaft, the brake wheel and the friction surface to drift axially apart and, accordingly, the braking coupling between them to loosen against the spring force of the spring device. Disc brakes of this kind are applied for instance to stop a transfer motion of a crane or a hoisting apparatus or to some other corresponding object not having a separate driving force provided by the force of gravity, for example.

A known disc brake in connection with a self-braking gearing is disclosed in German Patent 197 26 656. It serves as a load brake together with a motor, the speed of rotation of which is not going to an over-synchronized area and is thus not able to brake (to act as a generator). One end of the gearing shaft is then mounted in bearings at the end face of a casing, to which face around said shaft at a distance from and in parallel with it pins are fastened, to which the brake disc is arranged. Friction surfaces on discs supporting them, these discs being arranged on the gearing shaft non-rotatably, but axially movably, are arranged to bear against the surface of each side of the brake disc. The supporting disc situated farthest from the end face of the casing additionally comprises holes having a stepwise diameter, which holes are arranged at the same circumference at a predetermined distance from each other. At a distance from the last-mentioned supporting disc of the second friction surface, there is a pinion of the gearing, positioned axially unmovably, but rotatably on the gearing shaft. This pinion is, in turn, provided with the same number of openings having a conical cross-section as the supporting disc and arranged in the same way. A spring is arranged between the supporting disc provided with holes and the pinion of said gearing, and rocking levers are arranged between the supporting disc provided with holes and the corresponding holes in the pinion of the gearing. A force braking the gearing is provided in such a way that the spring mentioned above presses the friction surfaces of the supporting discs against the brake disc. In turn, the brake is opened by means of said rocking levers. For this purpose, the rocking levers have plate-like head portions dicker than their arm at the supporting disc end of the friction surfaces, the head portions extending through the holes in the supporting disc between the supporting discs and being pressed between them. Now, when the pinion of the gearing is subjected to torque, it begins to turn with respect to the supporting discs of the friction surfaces, whereby the rocking levers are able to move to an oblique position thanks to the design of the holes in the supporting disc and the pinion of the gearing. At the same time, the plate-like head portions of the rocking levers are prizing the supporting discs of the friction surfaces and thus the very friction surfaces apart from each other, so that the coupling which brakes the gearing is opened. Together with still increasing rotational angle between the supporting discs and the pinion of the gearing, the braking force decreases further, and when the drive torque reaches the sum of the residual braking torque and the load torque, the brake will open completely and the gearing shaft may rotate freely in the upwards direction (hoisting direction). The brake will not open in the downwards direction (falling direction), but load torque times rotational angle (rad) turns into heat ($E=T_L \times \phi$). This restricts the objects of use to smaller devices.

A problem with this solution is exactly this rocking lever arrangement, which opens the brake and is sensitive to wear and damages. The structure causes also noise, which is increased further by the wear. To make the braking and the opening of the brake to operate as desired, it is necessary to check carefully how the friction surfaces wear, because no adjustment can be carried out. Of course, this means as well that the function of the brake changes as per the wearing of the friction surfaces or the brake disc. The solution is also relatively complicated and requires a number of special parts and is not suitable to be used directly in connection with units to be formed of conventional electric motors and gearings.

European Patent Application 0 109 918 discloses a brake actuator, providing a strong pressure force on a pressure plate compressing a disk brake stack for braking of a rotating wheel. The actuator includes a stiff spring working in association with either an electric torque motor or a ball-screw mechanism to achieve an increased torque to a ring gear that drives a ram of the ball-screw mechanism into or out of engagement with the pressure plate, the spring being adapted either to activate or deactivate the braking operation. However, this brake actuator is only intended to intensify the brake influencing the wheels of an aircraft.

In the objects of use described in the beginning, the most conventional manner of switching on and off a brake has been, however, to use electromagnetic actuators, because they have been better than the known brakes to be opened mechanically by torque.

BRIEF DESCRIPTION OF THE INVENTION

The object of the invention is to start developing, on the basis of the prior art described in the beginning, best represented by said German Patent, such a disc brake to be opened mechanically by torque which could replace separate expensive electromagnetic brakes and which would be better than the prior art brakes in every respect.

This object can be reached by a disc brake in accordance with the invention, which is of the above type to be opened by torque and which is characterized in that the drive shaft and the driven shaft are interconnected in such a way that they may turn a restricted rotational angle with respect to each other and that means for causing said axial displacement and for loosening the braking coupling comprise cam means arranged between the brake wheel and the drive shaft.

The invention is based on the idea to couple the drive shaft and the driven shaft directly to each other, but yet in such a way that they are allowed to turn with respect to each other restrictively, which enables simple and very reliable axial pushing means to be arranged between the drive shaft and the brake wheel.

In comparison with electromagnetic brakes, an advantage of the brake of the invention consists primarily in that losses generally experienced as a drawback, such as for example friction torque of a driven device (at transfer gearing, for instance, resistance to motion of a trolley to be transferred) are utilized for opening the brake. Each time there is enough counter-torque at the driven device, the brake may open. The brake opens always, because, when the driving device (a squirrel-cage motor, for example) is started, it always has to overcome the brake torque, which it experiences as a countertorque. Because no separate magnet is needed for the operation of the brake, it is not necessary either to adapt the brake voltage to the motor voltage in electromotor applications, which is a great advantage. No rectifier is needed either. The opening force of the brake does not depend on the wearing of the friction surface, on account of which the brake does not need to be adjusted. The wear margin of the brake depends on the geometry of the cam means.

DESCRIPTION OF THE FIGURES

In the following, the invention will be described in further detail by means of preferred embodiments, with reference to the attached drawings, in which FIG. 1 shows a first object to which a disc brake of the invention to be opened by torque is applied and its implementation;

FIG. 2 shows a section 2—2 from FIG. 1;

FIG. 3 shows a section 3—3 from FIG. 1;

FIG. 4 shows another implementation of the disc brake of the invention to be opened by torque;

FIG. 5 shows a front view of a cam path of a brake wheel of FIG. 4;

FIG. 6 shows a side view of the cam path of the brake wheel of FIG. 4;

DETAILED DESCRIPTION OF THE INVENTION

Figure 7:
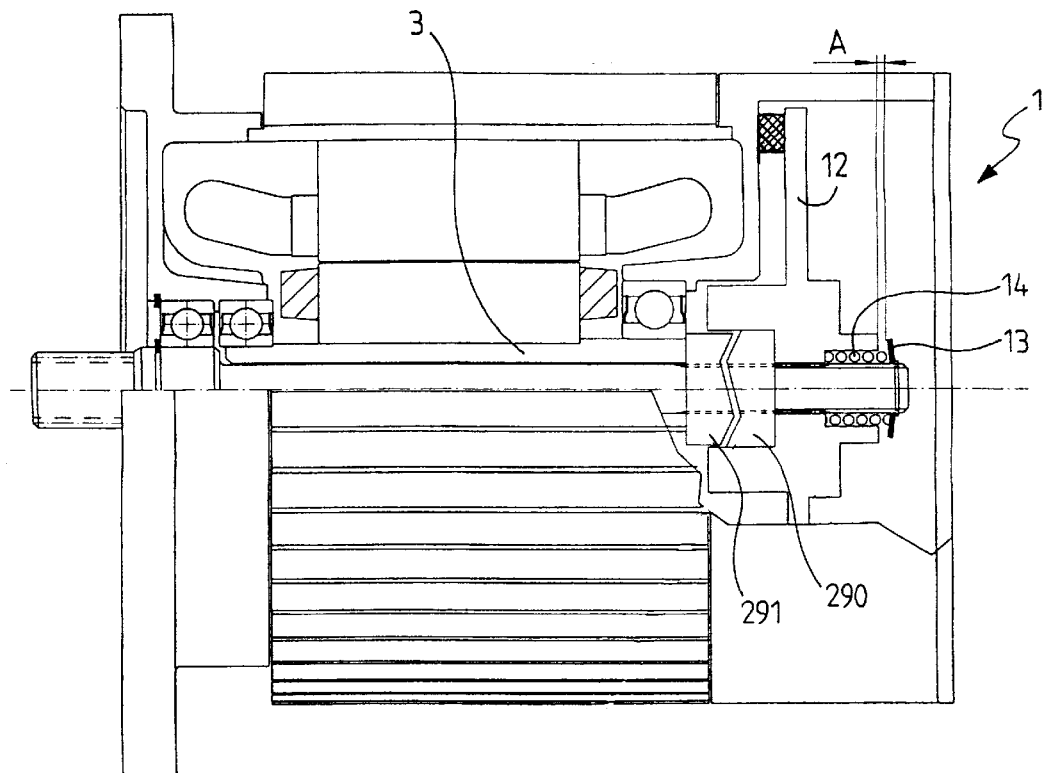
FIG. 7 shows a third implementation of the brake wheel according to the invention.

Referring to FIGS. 1 to 3, reference numeral 1 indicates an electric motor serving as a driving device and comprising a rotor 2 fastened by torque locking, i.e. non-rotatably, to a shaft 3 of the rotor, which shaft is mounted in bearings 4 and 5 at a body 6 of the motor. Reference numeral 7 indicates a driven device and especially its driven portion, e.g. in a trolley of a crane. The driven device 7 is coupled to a secondary shaft 9 of a gearing 8, while a primary shaft 10 of the gearing is connected to an output shaft 11 of the motor, i.e. the driven shaft, placed coaxially inside the rotor shaft 3, i.e. the drive shaft, and led through that, which driven shaft 11 is driven by the rotor shaft 3 via a brake wheel 12, fastened to the output shaft 11 non-rotatably in the peripherical direction. Between the brake wheel 12 and a stop 13 arranged on the output shaft 11 axially non-movably, there is a helical spring 14 surrounding the shaft 11 and pressing the brake wheel 12 against an annular friction surface 15 arranged fixedly on the body 6 of the motor.

The rotor shaft 3 and the output shaft 11 of the motor are interconnected in such a way that they may turn a restricted rotational angle with respect to each other. It has been implemented here by means of the rotor shaft 3 and the brake wheel 12 positioned partially inside each other, the brake wheel 12 comprising an axial annular recess 16 provided with a stop 17 projecting from its wall, and the rotor shaft 3 comprising an axial protrusion 18, which may turn within the limits determined by said stop 17 (FIG. 2).

On the other side, between the brake wheel 12 and the rotor shaft 3 of the motor, cam means 19 to 21 are arranged, which cause, by action of the torque and torsion of the rotor shaft 3, the brake wheel 12 and the friction surface to drift apart axially and thus the braking coupling between them to loosen against the spring force caused by the spring 14.

The cam means 19 to 21 comprise an annular cam path 19 arranged on that side surface of the brake wheel 12 which faces the rotor 2 and transverse shafts 20 fastened to the rotor shaft 3 and protruding an equal distance to its opposite sides, the ends of the transverse shafts being provided with bearings 21 arranged to run along the cam path 19 (FIG. 3).

The cam path 19 comprises two bottoms 22 on the opposite sides of the path and two peaks 23 in the middle of the path portions between these bottoms, which peaks are situated at a predetermined axial distance from the bottoms 22 and at the same longer axial distance from the surface of the brake wheel 12 as the bottoms. Then simultaneously, the rotational angle a between the rotor shaft 3 and the output shaft 11 (FIG. 3) has to be restricted to be smaller than the angle between the bottom 22 and the peak 23.

The disc brake shown in the FIGS. 1 to 3 functions as follows:

When the motor 1 is without current, it does not generate torque either. Then the spring 14 presses the brake wheel 12 against the friction surface 15. The braking torque is the function of the friction coefficients of the brake surfaces 12 and 15, their average radius and the force of the spring 14. When the motor 1 is switched on, it begins to generate torque, which tends to turn the rotor shaft 3 and the bearings 21 with respect to the cam path 19. This rotational motion generates an axial force between the bearings 21 and the cam path 19, which force is the function of the torque on the rotor shaft 3, the countertorque of the driven device 7 and the pitch of the cam path 19. This axial force overcomes the force of the spring 14 and displaces the brake wheel 12 off the friction surface 15. The rotor 2 may then rotate freely. The torque needed for accelerating the driven device 7 and the brake wheel 12 contributes to the opening of the brake in the same way as the friction torque of the driven device. Each time, there is enough torque on the secondary side, the brake may open. The brake opens always, because when the motor 1 starts it has to overcome the brake torque, which it experiences as a countertorque. When the motor 1 is switched off again, the motor 1 stops generating torque. Then the spring 14 presses the brake wheel 12 against the friction surface 15 again, which makes the whole system to brake.

A condition for the above function is primarily the above-described torsion possibility of the rotor shaft 3 with respect to the output shaft 11 (brake wheel 12). In the extreme positions of this torsion, there is a metal/metal contact between the interconnecting parts 3 and 11, which contact transmits the torque of the motor 1 by means of the shaft 11. Said torsion and the pitch of the cam path 19 generate the axial force needed to open the brake. A big enough countertorque must prevail at the driven device 7 to keep the brake open. The pitch of the cam path 19 must not be self-retaining so that the brake may close. This is implemented in such a way that the tangent of the pitch of the cam path 19 is clearly bigger than the friction coefficient between the cam path 19 and its counterpiece (bearings 21). When the brake is closing, the retardation of the rotor 2 must not be so big that the generated torque opens the brake. The accelerations on account of the load must not be so big either that the acceleration torque of the motor 1 would open the brake. On the other side, the fact that the brake opens because of the accelerating forces caused by a swaying motion of the load, for instance, may be a desirable feature, because the opening of the brake in this case leads to that the trolley is displaced above the load, which cancels the swaying motion. These characteristics can be affected by the flier mass of the brake wheel 12. The axial motion of the brake wheel 12 has to be restricted to be smaller than the pitch of the cam path 19 in order that the above opening mechanism does not "go over its limits".

FIGS. 4 to 6 show another embodiment of the disc brake according to the invention, which differs from the embodiment of the FIGS. 1 to 3 therein that the cam means 19 to 23 are replaced by another kind of cam path 190 of the brake wheel 12 and an obliquely mounted bearing 200 of the rotor shaft 3. The mutual torsional motion of an edge 200a of the oblique bearing 200 against the brake wheel 12 and the cam path 190 provides a similar action, i.e. an axial motion of the brake wheel 12 to open or close the brake, as in the first embodiment. The cam path 190 comprises the lowest point 190a, two rising path portions 190b extending therefrom and an even path portion 190c without rise between them. The rising portions 190b are restricted to correspond to the mutual torsion of the rotor shaft 3 and the brake wheel 12.

FIG. 7 shows a third embodiment of the disc brake of the invention, which differs from the embodiment of the FIGS. 1 to 3 primarily therein that the cam means 19 to 23 are replaced by a first annular cam path 290 arranged on the brake wheel 12 and by a second similar cam path 291 arranged on the rotor shaft 3, which paths cooperate and provide the axial motions between the brake wheel 12 and the rotor shaft 3 corresponding to those in the two first-described embodiments. The number of the cams of the cam paths 290 and 291, i.e. the number of high and low points, may be 2 to n, still the same number on each path. A second difference is that the restricted torsion between the rotor shaft 3 and the output shaft 11 with respect to each other has been implemented by restricting the axial motion A of the brake wheel 12 to be smaller than the axial motion determined by the cam paths 290 and 291, in which case the torque is transmitted from the rotor shaft 3 to the output shaft 11 by means of a coupling between the cam paths 290 and 291. The axial motion of the brake wheel 12 is restricted by means of a stop 13 fastened to the rotor shaft 3 and pressing the spring device 14 against the brake wheel 12. So, no annular recess 16, no stop 17 and no projection 18 according to the first and second embodiment are needed.

Figure 8:
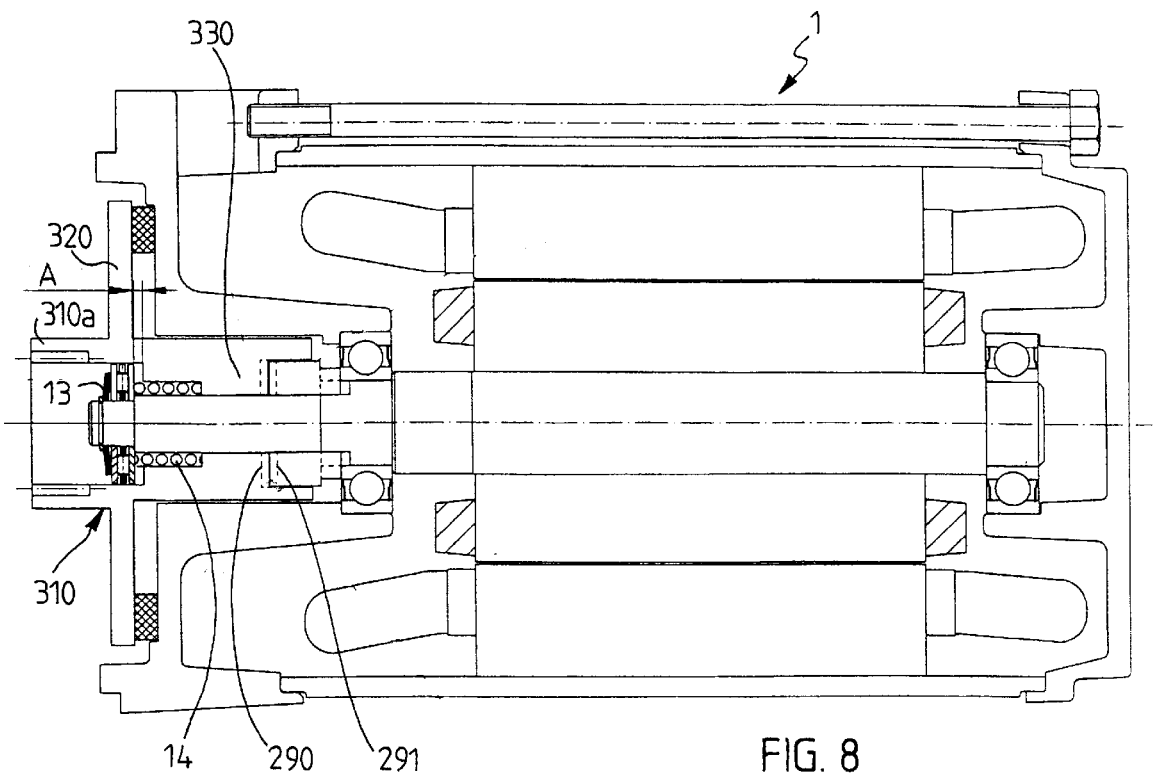
FIG. 8 shows a fourth implementation of the brake wheel according to the invention.

A fourth embodiment of the disc brake according to the invention shown in FIG. 8 differs from all preceding embodiments therein that the brake wheel 320 and the output shaft 310 are formed to one integral whole, which is mounted at one end of the rotor shaft 330, where it may turn and move axially within predetermined limits. These restricted possibilities of motion are implemented by means of a cam and stop arrangement 290, 291 and 13 similar to that of the embodiment of FIG. 7. Here the stop 13 and the spring 14 are mounted on the rotor shaft 330, whereby the end of the output shaft 310 transmitting the torque forward protrudes as an annular projection 310a past the rotor shaft 330.

The axial motion implemented in the FIGS. 7 and 8 could, of course, be effected in the same way as in the embodiments of the FIGS. 1 to 6, but it would complicate the structure unnecessarily, because the cam paths 290 and 291 as described in the FIGS. 7 and 8 endure well also the transmission of the motor torque, opposite to the cam means 19 to 21 and 190 to 200 of the embodiments of the FIGS. 1 to 6.

The above specification of the invention is only meant to illustrate the basic idea of the invention. However, one skilled in the art may implement the invention and its details in many alternative manners within the scope of the attached claims. Accordingly, the torsion of the drive shaft and the driven shaft with respect to each other and the cam means between the brake wheel and the drive shaft can be implemented in many other ways known from other connections and details of the embodiments shown in the drawings can be combined. The coupling between the driving device and the driven device may also be such that the driven shaft and the brake wheel are situated at the driven device, in the gearing, for instance, which again may form an integral structure with the driving device or be entirely separate from it.

What is claimed is:

1. Disc brake to be opened by torque, the disc brake being arranged between a drive shaft and a driven shaft and comprising at least one brake wheel arranged on the driven shaft non-rotatably in the peripheral direction;

at least one friction surface arranged to cooperate with the brake wheel;

at least one spring device arranged to press the brake wheel axially against the friction surface; and means causing, by the action of the torque and torsion of the drive shaft and a possible countertorque of the driven shaft, the brake wheel and the friction surface to drift axially apart and, accordingly, the braking coupling between them to loosen against the spring force of the spring device, whereby the drive shaft and the driven shaft are interconnected in such a way that they may turn a restricted rotational angle with respect to each other and that means for causing said axial displacement and for loosening the braking coupling comprise cam means arranged between the brake wheel and the drive shaft, and whereby the cam means comprise a first annular cam path arranged on the brake wheel and a second similar cam path arranged on the drive shaft, which second cam path cooperates with the first cam path, wherein the restricted torsion between the drive shaft and the driven shaft with respect to each other is implemented by restricting the axial motion of the brake wheel to be smaller than the axial motion determined by the cam paths, whereby the torque is transmitted from the drive shaft to the driven shaft by means of a coupling between the cam paths.

2. Disc brake according to claim 1, wherein the second cam path comprises a transverse shaft arrangement fastened to the drive shaft and projecting to its opposite sides, both ends of the arrangement being provided with bearings arranged to run along the first cam path.

3. Disc brake according to claim 2, wherein the first cam path comprises two bottoms on the opposite sides of the path and two peaks in the middle of the path portions between these bottoms, which peaks are situated at a predetermined axial distance from the bottoms and at a longer axial distance from the surface of the brake wheel than the bottoms.

4. Disc brake according to claim 1, wherein the second cam path comprises an obliquely mounted bearing on the drive shaft, which bearing cooperates with the first cam path.

5. Disc brake according to claim 1, wherein the axial motion of the brake wheel is restricted by means of a stop fastened to the driven shaft and pressing the spring device against the brake wheel.

6. Disc brake according to claim 1, wherein the restricted torsion between the drive shaft and the driven shaft with respect to each other is additionally restricted by means of the drive shaft and the brake wheel arranged partially inside each other, whereby the brake wheel comprises an axial annular recess provided with at least one restrictor projecting from its wall, and the drive shaft comprises at least one axial projection, which may turn within the limits determined by said restrictor.

7. Disc brake according claim 1, wherein the driven shaft belongs to the driving device.

8. Disc brake according to claim 1, wherein the driven shaft is situated inside the drive shaft and is intended to be coupled to the driven device to drive it.

9. Disc brake according to claim 1, wherein the brake wheel and the driven shaft are formed to one integral whole, which is mounted at one end of the drive shaft.

10. Disc brake according to claim 1, wherein the axial motion of the brake wheel is restricted by means of a stop fastened to the drive shaft and pressing the spring device against the brake wheel.

* * * * *